US009299043B2

(12) United States Patent
Zehler et al.

(10) Patent No.: US 9,299,043 B2
(45) Date of Patent: Mar. 29, 2016

(54) VIRTUAL MACHINE-READABLE TAGS USING SENSOR DATA ENVIRONMENTAL SIGNATURES

(71) Applicant: Xerox Corporation, Norwalk, CT (US)

(72) Inventors: Peter J. Zehler, Penfield, NY (US); Gavan L. Tredoux, Penfield, NY (US); Premkumar Rajendran, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 121 days.

(21) Appl. No.: 14/109,196

(22) Filed: Dec. 17, 2013

(65) Prior Publication Data
US 2015/0170064 A1    Jun. 18, 2015

(51) Int. Cl.
G06F 17/00 (2006.01)
G06Q 10/06 (2012.01)

(52) U.S. Cl.
CPC .................................. *G06Q 10/06* (2013.01)

(58) Field of Classification Search
CPC ...................................................... G06Q 10/06
See application file for complete search history.

(56) References Cited

U.S. PATENT DOCUMENTS

| 8,229,458 | B2 | 7/2012 | Busch |
| 8,321,922 | B1 | 11/2012 | Lo et al. |
| 8,325,044 | B2 | 12/2012 | Martinez de Velasco Cortina et al. |
| 2010/0148977 | A1 | 6/2010 | Tseng et al. |
| 2010/0299527 | A1 | 11/2010 | Arunan et al. |
| 2011/0248851 | A1 | 10/2011 | Pham |
| 2011/0313922 | A1 | 12/2011 | Ben Ayed |
| 2012/0052872 | A1* | 3/2012 | Do ............................. 455/456.1 |
| 2012/0143495 | A1 | 6/2012 | Dantu |
| 2012/0202423 | A1* | 8/2012 | Tiedemann et al. ......... 455/41.1 |
| 2012/0290254 | A1 | 11/2012 | Thrun et al. |
| 2013/0132282 | A1 | 5/2013 | Shakkarwar |
| 2013/0185213 | A1 | 7/2013 | Insanic |

FOREIGN PATENT DOCUMENTS

| EP | 2 420 854 | 2/2012 |
| WO | 2013/072437 | 5/2013 |
| WO | 2013/121356 | 8/2013 |

* cited by examiner

*Primary Examiner* — Thien M Le
*Assistant Examiner* — Asifa Habib
(74) *Attorney, Agent, or Firm* — Gibb & Riley, LLC

(57) ABSTRACT

Methods and systems detect a near field communication tap using a force detector of a portable computerized device, automatically sense current environmental conditions in response to the near field communication tap (using sensors of the portable computerized device) and automatically calculate a current location-based environmental signature based on the current environmental conditions sensed by the sensors, using a processor of the portable computerized device. Also, such methods and systems automatically match the current location-based environmental signature to a matching previously stored location-based environmental signature, using the processor and a communications device of the portable computing device. Such methods then automatically obtain a machine identification code associated with the matching previously stored location-based environmental signature from the non-transitory computer readable storage medium, using the processor and the communications device, and automatically process a workflow using the machine identification code and the processor.

20 Claims, 5 Drawing Sheets

VIRTUAL MACHINE-READABLE TAGS USING SENSOR DATA ENVIRONMENTAL SIGNATURES

CROSS-REFERENCE TO RELATED APPLICATIONS

This application is related to the following co-pending application filed concurrently herewith by the same Applicants and assigned to the same Assignee: VERIFYING RELATIVE LOCATIONS OF MACHINE-READABLE TAGS USING COMPOSITE SENSOR DATA", Ser. No. 14/109,303. The complete disclosure of this co-pending application is incorporated herein by reference.

BACKGROUND

Systems and methods herein generally relate to creating virtual machine readable codes or tags (RFID, QR, NFC, Bluetooth, etc.) for use by devices not having tag reading capability.

Tags or identification codes can be maintained in wireless devices that can be read by equipment such as near field communication (NFC) systems, radio frequency identification systems (RFID), and Bluetooth systems; or similar systems. Such identification codes are commonly used to identify equipment and features or provide other information that is location-sensitive, and some devices such as smartphones can read machine-readable tags, while others cannot.

These NFC tags operate at very short distances, usually requiring a physical touch, but theoretically a few centimeters distance. Such tags have information that can be read by NFC readers. This information can be used by a dispatch system on the mobile device to start an associated behavior. For example, if the tag contains a universal resource locator (URL), a browser on the portable device might be launched to display the content at the specified website. In another example, if the NFC tag contains data specifying an application, that application would be launched. If the tag contains additional records, the data in those records would be passed to the application. Other examples include data within the NFC tag modifying device settings, allowing connection to a specific network, etc. One limitation of such systems is that the portable device reading the tag must be near field capable (e.g., have near field wireless features/devices) in order to obtain information from the tag and take the specific action associated with the tag.

SUMMARY

Exemplary portable computerized devices herein comprise a force detector that detects a near field communication tap, potentially while the portable computerized device is positioned at a location that is within a predetermined distance from a machine that the owner of the portable device would like to use. Such a "near field communication tap" is the type of motion usually used to initiate near field communications and can include a user tapping, touching, bumping, etc., their portable device against a surface (such as the surface of a machine that is associated with an actual tag or virtual tag representing machine readable code identifying the machine, or some other surface associated with an actual or virtual tag), or a user placing their portable device on such a surface.

The portable computerized devices include sensors operatively (meaning directly or indirectly) connected to the force detector. In response to the near field communication tap, the sensors automatically sense current environmental conditions of the location of the machine in response to the near field communication tap. The portable computerized devices include a processor operatively connected to the sensors. The processor automatically calculates a "current location-based environmental signature" based on the current environmental conditions sensed by the sensors.

Also, the portable computerized devices include a communications device operatively connected to the processor. The communications device automatically matches the current location-based environmental signature to a matching previously stored location-based environmental signature (of a plurality of previously stored location-based environmental signatures maintained in a non-transitory computer readable storage medium). Further, the processor and communications device obtain a machine identification code associated with the matching previously stored location-based environmental signature from the non-transitory computer readable storage medium. The processor uses such a machine identification code to process a workflow. In some examples, the machine identification code identifies the machine located where the current environmental conditions were sensed by the sensors, and the workflow is performed, at least in part, using that machine.

Exemplary systems herein comprise a first portable computerized device and a set of computer-executable instructions. The first portable computerized device includes a first force detector (e.g., accelerometer, etc.) that detects a near field communication tap during a process of setting up or registering a virtual tag (potentially while the first portable computerized device is positioned at a location that is within a predetermined distance from a given machine).

Further, the first portable computerized device includes first sensors operatively connected to the first force detector. The first sensors automatically sense present environmental conditions (e.g., the lighting level, the sound level, the temperature, the altitude, the barometric pressure, compass heading, a wireless signal strength, a wireless signal type, etc.) of that location in response to the near field communication tap.

The first portable computerized device includes a first processor operatively connected to the first sensors. The first processor automatically calculates a previously stored location-based environmental signature based on the present environmental conditions sensed by the first sensors. The first portable computerized device includes a first communications device operatively connected to the first processor. The first communications device automatically stores the previously stored location-based environmental signature in a non-transitory computer readable storage medium. When storing the previously stored location-based environmental signature, the first communications device also associates the previously stored location-based environmental signature with a machine identification code (possibly associated with the machine that is at that location).

The computer-executable instructions cause an additional or "second" force detector of a different or "second" portable computerized device to detect an additional or "second" near field communication tap. Sensors of the second portable computerized device (referred to as "second" sensors herein) are then directed (by the computer-executable instructions) to automatically sense current environmental conditions in response to the second near field communication tap, and a "second" processor of the second portable computerized device is similarly directed (by the computer-executable instructions) to automatically calculate a current location-based environmental signature based on the current environmental conditions sensed by the second sensors.

Further, the computer-executable instructions cause a second communications device of the second portable computerized device to automatically match the current location-based environmental signature to a matching previously stored location-based environmental signature of the plurality of previously stored location-based environmental signatures maintained in the non-transitory computer readable storage medium. The second processor and the second communications device are then directed (by the computer-executable instructions) to obtain a machine identification code associated with the matching previously stored location-based environmental signature from the non-transitory computer readable storage medium. The second processor can then use the machine identification code to process a workflow.

Various methods herein detect a near field communication tap using a force detector of a portable computerized device (potentially while the portable computerized device is positioned at a location that is within a predetermined distance from a machine that is associated with a virtual tag). Such methods automatically sense current environmental conditions of the location in response to the near field communication tap, using sensors of the portable computerized device and automatically calculate a current location-based environmental signature based on the current environmental conditions sensed by the sensors, using a processor of the portable computerized device.

Also, such methods automatically match the current location-based environmental signature to a matching previously stored location-based environmental signature of a plurality of previously stored location-based environmental signatures maintained in the non-transitory computer readable storage medium, using the processor and a communications device of the portable computing device. Such methods then automatically obtain a machine identification code associated with the matching previously stored location-based environmental signature from the non-transitory computer readable storage medium, using the processor and the communications device, and automatically process a workflow using the machine identification code and the processor.

Additional methods herein include processes of setting up or registering a virtual tag (potentially in the location of a specific machine that will be associated with the virtual tag). These methods detect a near field communication tap (using a first force detector of a first portable computerized device of the administrator or service engineer who does the initial set up of the virtual tag) while the first portable computerized device is positioned at a location that is within a predetermined distance from the machine.

Further, these methods automatically sense present environmental conditions (e.g., the lighting level, the sound level, the temperature, the altitude, the barometric pressure, compass heading, a wireless signal strength, a wireless signal type, etc.) of the location that were present while the virtual tag is being registered (using first sensors of the first portable computerized device) and automatically calculate a location-based environmental signature based on the present environmental conditions sensed by the first sensors (using a first processor of the first portable computerized device).

Then, such methods can automatically store the location-based environmental signature (referred to herein as the "previously stored" location-based environmental signature) in a non-transitory computer readable storage medium (computer storage) using a first communications device of the first portable computerized device. The process of storing the previously stored location-based environmental signature also includes a process of associating the previously stored location-based environmental signature with a machine identification code (potentially associated with the machine at that location). This completes the initial setup process (e.g., registration) of the virtual tag for the machine identification code device that is at that location.

After the virtual tag is registered, a user can access the virtual tag. This process occurs when a second near field communication tap is detected using a second force detector of a second portable computerized device. These methods automatically sense current environmental conditions in response to the second near field communication tap, using second sensors of the second portable computerized device. Then, such methods automatically calculate a current location-based environmental signature based on the current environmental conditions sensed by the second sensors, using a second processor of the second portable computerized device.

This allows these methods to automatically match the current location-based environmental signature to a matching previously stored location-based environmental signature (of a plurality of previously stored location-based environmental signatures maintained in the non-transitory computer readable storage medium) using the second processor and a second communications device of the second portable computing device. Also, this method can thus automatically obtain a machine identification code associated with the matching previously stored location-based environmental signature from the non-transitory computer readable storage medium, using the second processor and the second communications device. Then, these methods can automatically process a workflow using the machine identification code and the second processor.

Further, these methods can refine the previously stored location-based environmental signature based on multiple current location-based environmental signatures obtained as the users perform multiple processes of verifying the possibly matching machine identification code.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
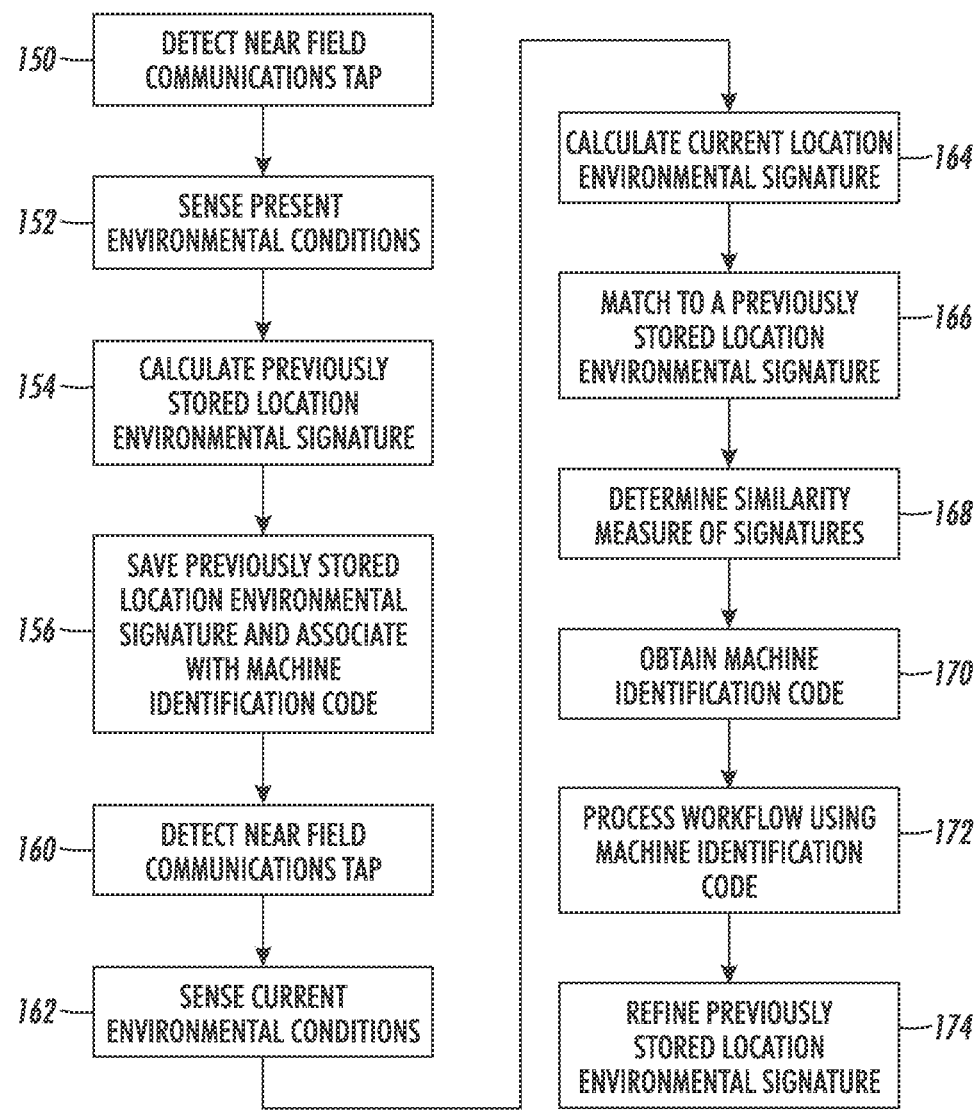
FIG. 1 is a flow diagram of various methods herein.

As mentioned above, the device reading the tag must be NFC capable in order to obtain information from the NFC tag, and to take the specific action associated with the tag. The systems and methods herein use a mobile device's sensors (Wi-Fi signal strength, compass readings, ambient light and noise, etc.) to create a unique electronic location-based environmental signature based on the current surroundings, and associate the location-based environmental signature with an NFC tag identifier.

When an installer initially sets up the system, a unique tag identifier (such as serial number of the tag) is obtained. At the same time, a number of the installer's mobile device's sensors are accessed and an associated location-based environmental "signature" is calculated based on readings from such sensors. Both the tag identifier and the location-based environmental signature are registered, and stored locally on the mobile or remotely in a server. Additionally, the tag identifier can be associated with metadata containing application specific data such as the name of an application to launch, a URL to load, network information to enable local connectivity, etc.

After installation, a user having a non-NFC capable device may be in the location of the tag, and therefore be present where the installer was when they created the stored location-based environmental signature for the tag. In order for the non-NFC device to enjoy the same benefits of NFC capable devices, the non-NFC device uses its own sensors to calculate a current location-based environmental signature.

This current location-based environmental signature is then matched (locally or remotely) with the previously stored location-based environmental signature previously created by the installer. Upon a match (which is sometimes referred to herein as a "virtual tag touch") the tag is identified and the user's portable device is provided the same information that is contained in the tag (from local or remote storage). Probabilistic matching of the location-based environmental signatures may be used. In this way, device behavior can be set to occur only within with a user defined probability range.

Thus, when such a "virtual tag touch" is performed, the user's mobile device's sensors are accessed and a current location-based environmental signature is calculated. The "virtual tag touch" process can be initiated by detecting a tap, bump or the user's portable device being placed on a surface (using, for example, accelerometer or orientation sensors of the user's device). The current location-based environmental signature is matched with the previously stored location-based environmental signature to identify the previously registered tag identifier and obtain its associated metadata. The device then processes the metadata, and the appropriate application is launched and supplied with the required metadata.

Thus, the systems and methods herein provide similar NFC behavior for non-NFC capable devices. With systems and methods herein whether or not the user's device is NFC capable, when the user touches an NFC tag at a given location, the same NFC behavior would occur, so that it appears that the user's device is NFC capable (even when it is not). Further, the systems and methods herein are equally applicable to touching a registered location that does not have a tag.

Stated more specifically, the systems and methods herein start by identifying a location for a "virtual tag." This location may or may not be co-located with an NFC tag. Then, the "virtual tag" is "registered" by a mobile device operated by the administrator performing the registration, for example. The mobile device generates or obtains a unique tag identifier, and then records data from various sensors. The data is used to create a composite location-based environmental signature (an n-tuple consisting of recorded sensor values). Many such sensors are commonly available on mobile devices, e.g. magnetic compass, Wi-Fi (802.11x, 3g/4g), microphone, camera, barometer, altimeter, thermometer, etc. Further, computation on the n-tuple may or may not be required, depending on the algorithm that is implemented.

Next, the mobile device records the n-tuple value indicating where the "virtual tag" is relatively located, either locally using its own storage, or remotely on a server. This value (sometimes referred to herein as the "previously stored location-based environmental signature") is stored so that it may be consulted later. Storing the previously stored location-based environmental signature on a remote server has the advantage of allowing multiple mobile devices to access the same "virtual tag." Another feature of using a remote server is collaboration in establishing and checking location-based environmental signatures to refine such signature. Every time the n-tuple is read, the existing records may also be updated to reflect the latest values, using an appropriate smoothing algorithm if desired, to refine such signature. Once the location-based environmental signature and tag identifier are registered and stored (remotely or locally) associated metadata can be included to provide the information usually stored on a physical tag.

After the virtual tag is created, a subsequent user can walk to the location of the virtual tag. The availability of the actual or virtual tag can be indicated by a physical sign or by markings at the location (e.g., a sticker, a symbol, etc.). A mobile application of computer-executable instructions (sometimes referred to as an "app") can be running in the background on a mobile device, and such an app can detect a "virtual tag touch" (again, using internal orientation or accelerometers). Example of this would be a bump or tap noise (or accelerometer reading) or the device reaching a quiescent state when being placed on the "virtual tag."

After the virtual tag touch is detected, the n-tuples of sensor readings are obtained and a current location-based environmental signature is calculated. That current location-based environmental signature is then matched to one of many previously stored location-based environmental signatures to find the associated tag identifier. The database of previously stored location-based environmental signatures can be located on the user's portable device or hosted remotely.

Many methods could be used to assign a confidence level to the location-based environmental signature match, including cluster-analysis methods including: discriminant analysis, logistic regression, support vector machines, regression trees and other methods based on calculating distance metrics in the n-tuple space, such as Mahalanobis Distance. The systems and methods herein use a configurable tolerance that is applied to the confidence level to permit user control over device behavior.

The information returned is used by the app to determine if an appropriate match exists. The information returned in response to the location-based environmental signature match includes the tag identifier, associated metadata, and confidence level. Assuming that a viable match exists, the appropriate application is launched and provided with any additional data included in the metadata.

The notion of location that is used by the systems and methods herein is only relative, and can be merely a unique location-based environmental signature, with no relationship to other locations. This is contrasted to positioning systems such as GPS, which establish a location that is relative to other locations on the longitude and latitude scales. GPS-type location knowledge is sometimes limited because GPS requires unobstructed access to satellite signals, which is problematic inside buildings. Additionally, a specific location, or geolocation, could vary based on the orientation of the device. For example this allows one behavior for a touch with the mobile device facing up and a different behavior touching the same location with the mobile device face down.

The systems and methods herein use a mobile device's sensors (Wi-Fi signal strength, compass readings, ambient light and noise, etc.) to create unique electronic signatures of current surroundings, and associate those with a tag identifier. For purposes herein, a "tag," "tag identifier," and "machine identification code" refer to any machine-readable item containing data or codes, such as near field communication systems (NFC) radio frequency identification systems (RFID), Bluetooth systems, etc.) or similar systems.

When an actual tag is initially placed into service, with methods and systems herein, the mobile device reads the tag identifier, e.g. using NFC, and simultaneously obtains a number of environmental characteristics detected by the mobile device's sensors. The systems and methods herein use such environmental characteristics to calculate and environmental signature that is then associated with that specific tag. Recording both the tag identifier and the signature, locally on the mobile or in a server, allows later use as a virtual tag by matching the current environmental signature against the previously stored environmental signature associated with the tag identifier. Probabilistic matching may be used in some different applications by systems and methods herein.

Tags that can be read by mobile devices have many applications. The tags take multiple forms, such as NFC/RFID tags, or Bluetooth tags, etc. The tags may be read-only, or both readable and writeable. Such tags have unique identifiers that can be read. Typically, such tags are used for identification purposes when affixed to a position or object, and if additional assumptions are made about the fixity of their location, to infer that the user is in a definite spot when reading them and thus referring to a proximate object or asset, such as a multi-function printing device (MFD), a particular hallway door, a storage closet, or similar equipment. Alternatively, the tag may simply hold information about the proximate object such as its network address, associated servers and so on, and the user may want to read this information to pair with it.

One prominent kind of tag is the rewritable passive NFC tag. The reader and writer of such tags has to be physically close to the tag (say, less than 1 meter or similar distance limit) and the tag is passive in that the reader/writer supplies the power source, so that the tag can be affixed externally or internally without any other integration to a broad range of objects or places, e.g. to MFD devices.

The systems and methods herein provide virtual tags to allow devices that do not have the ability to read wireless near field identifiers, the same ability as those that do. In an oversimplified example, with systems and methods herein, one or more tags are affixed to objects. These may be complex devices such as MFDs, or anything else to which a tag can be affixed, such as doors, lights, monitors and so on. Immediately before or after being affixed to the objects (or activated if they are permanent features of the objects) the tags are "enrolled" using a mobile device, for example. The mobile device used in registration can be capable of reading identifiers from the tags. Also, data from the mobile device's various sensors is obtained by the mobile device and used to create a composite location signature (an n-tuple consisting of recorded sensor values). Many sensors commonly available on mobile devices include a magnetic compass, Wi-Fi (e.g., 802.11x, 3g/4g), microphone, camera, barometer, altimeter, thermometer, etc. Further refinement of the n-tuple may or may not be performed, depending specific implementation. The mobile device can record the n-tuple value as the environmental signature (either locally using its own storage, or remotely on a server) and, at the same time, indicate where the tag is located.

After the virtual tag is initially registered, the user can employ an application (app), which is a set of computer instructions causing the processor of the user's mobile device to execute some or all of the instructions. In this example, the app would cause the processor of the mobile device to record as many of the environmental conditions as the mobile device is capable of obtaining to calculate a "current" n-tuple representing the current environmental signature and match that signature to a previously stored signature to obtain the information that the actual tag contains.

Storing the associated environmental signatures on a server (or other common-access storage location) has the advantage of allowing mobile devices to collaborate in establishing and refining the n-tuples that represents the environmental signatures. For example, every time a mobile device utilizes the tag, the existing environmental signature may also be refined to reflect the latest environmental condition sensed by the most recent user(s), using an appropriate smoothing process (if desired).

The app causes the processor of the mobile device to compare the current environmental signature with the previously stored environmental signature (by comparing the current n-tuple value with the previously stored (and possibly refined) n-tuple value associated with the tag read by the user's mobile device)).

Further, the systems and methods herein support a heterogeneous collection of mobile devices that may have different sensors and sensor configurations. By having all the mobiles record tuples of data, the best matching tuple (with readings from the same or similar sensor repertoire) can be used for the current mobile device when matching. Thus, if a device does not have an altimeter, tuples recorded by devices without altimeters may be used in the matching process (or the altimeter portion of the tuple can be removed from the calculation).

Thus, for mobile devices that are not capable of reading tags, the systems and methods herein can match the current environmental signature to stored environment signatures to determine the virtual tag for that store environmental signature. This allows systems and methods herein to grant access to mobile devices that are not capable of reading tags based upon the current environmental signature identified by the mobile device. Thus, the tag contents can be transmitted to the mobile, and thus the mobile does not need to have the ability to read, for example, NFC tags since the current environmental signature calculated by the mobile device may suffice.

As noted above, various methods herein detect a near field communication tap using a force detector of a portable computerized device (potentially while the portable computerized device is positioned at a location that is within a predetermined distance from a machine that is associated with a virtual tag). Such a "near field communication tap" is the type of motion usually used to initiate near field communications and can include a user tapping, touching, bumping, etc., their portable device against a surface (such as the surface of a machine that is associated with an actual tag or virtual tag representing machine readable code identifying the machine, or some other surface associated with an actual or virtual tag), or a user placing their portable device on such a surface.

While the concept of an item being touched or tapped by another item is well-understood, for clarity herein, a near field communication-type "tap"; "touch"; or "bump" occurs when a user causes the distance between the first device and the second device to change from a first distance to a second, closer distance and then return to at least the first distance within a predetermined period of time (where, for example, the first distance between the devices can be at least twice as large than the second, closer distance). The predetermined period of time can be, for example, less than 5 seconds and the second distance can be, for example, less than 5 cm. Further, while these motions may actually cause the separate items to make brief physical contact, physical contact (zero distance separation) is not required.

Such methods automatically sense current environmental conditions of the location in response to the near field communication tap, using sensors of the portable computerized device and automatically calculate a current location-based environmental signature based on the current environmental conditions sensed by the sensors, using a processor of the portable computerized device.

Also, such methods automatically match the current location-based environmental signature to a matching previously stored location-based environmental signature of a plurality of previously stored location-based environmental signatures maintained in the non-transitory computer readable storage medium, using the processor and a communications device of the portable computing device. Such methods then automatically obtain a machine identification code associated with the matching previously stored location-based environmental signature from the non-transitory computer readable storage medium, using the processor and the communications device, and automatically process a workflow using the machine identification code and the processor.

Some methods install or activate a machine identification code device attached to a machine. This machine identification code device can comprise, for example, a magnetic device (iron oxide device), a radio frequency device (RFID device, Wi-Fi device, Bluetooth device, etc.), etc.

These methods detect a near field communication tap using a first force detector of a first portable computerized device. For example, the arbitrarily named "first" portable computerized device can be a smartphone or PDA of an administrator or service engineer who is performing the initial setup of the machine identification code with the actual tag and/or registration of the virtual tag.

During such initial setup, or even if no actual machine identification code device (actual tag) is present in the machine, the processing herein includes steps of setting up or registering the virtual tag (potentially in the location of a specific machine that will be associated with the virtual tag). These methods detect a near field communication tap in item 150 in FIG. 1 (using a first force detector of a first portable computerized device of the administrator or service engineer who does the initial set up of the virtual tag) while the first portable computerized device is positioned at a location that is within a predetermined distance from the machine.

Further, in item 152, these methods automatically sense present environmental conditions (e.g., the lighting level, the sound level, the temperature, the altitude, the barometric pressure, compass heading, a wireless signal strength, a wireless signal type, etc.) of the location of the machine that were present while reading the machine identification code (using first sensors of the first portable computerized device). Then, in item 154, these methods automatically calculate a location-based environmental signature based on the present environmental conditions sensed by the first sensors (using a first processor of the first portable computerized device).

Then, in item 156, such methods can automatically save the location-based environmental signature (referred to herein as the "previously stored" location-based environmental signature for convenience) in a non-transitory computer readable storage medium (computer storage) using a first communications device of the first portable computerized device. The process of storing the location-based environmental signature in item 156 also includes a process of associating the previously stored location-based environmental signature with a machine identification code (potentially associated with the machine at that location). This completes the initial setup process (e.g., registration) of the virtual tag for the machine identification code device that is at that location.

After the virtual tag is registered, a user can access the virtual tag. This process occurs when a second near field communication tap is detected in item 160 using a second force detector of a second portable computerized device. These methods automatically sense current environmental conditions of the second location in response to the second near field communication tap in item 162, using second sensors of the second portable computerized device. Then, such methods automatically calculate a current location-based environmental signature in item 164 based on the current environmental conditions sensed by the second sensors, using a second processor of the second portable computerized device.

This allows these methods to automatically match the current location-based environmental signature to a matching previously stored location-based environmental signature (of a plurality of previously stored location-based environmental signatures maintained in the non-transitory computer readable storage medium) in item 166 using the second processor and a second communications device of the second portable computing device. Further, to confirm that such matching is valid, these methods can automatically compare the current location-based environmental signature with the matching previously stored location-based environmental signature to determine a similarity measure of the location-based environmental signatures (of the current location-based environmental signature and the matching previously stored location-based environmental signature) in item 168, using the second processor.

When working with the current location-based environmental signature, the methods and systems herein automatically compensate for differences between the sensors of the administrators device (first portable computerized device) used during registration of the virtual tag to create the previously stored location-based environmental signature and the user's device (second portable computerized device). Therefore, for example, if the second portable computerized device contains less sensors (or less accurate sensors) than the first portable computerized device, the systems and methods herein automatically adjust (or remove) the value of the readings from sensors that are different on the two different devices. For example, if the first portable computerized device included an altimeter, but the second portable computerized device did not include an altimeter, the altimeter contribution to the previously stored location-based environmental signatures would be adjusted out to make the two different signatures more easily comparable during the processing in item 166 and 168. Those ordinarily skilled in the art would understand that other similar adjustments can be made to the different signatures to make them more easily comparable.

Thus, these methods perform a verification process that can establish a percentage probability that the signatures match (as a "similarity measure"). If the percentage probability (similarity measure) is above a certain amount (75%) the signatures can be considered matching. As would be understood by those ordinarily skilled in the art, different matching criteria can be utilized and the predetermined threshold (such as the 75%, mentioned above) can be adjusted (and potentially user-adjusted) depending upon the accuracy level required.

Also, this method can automatically obtain the machine identification code associated with the matching previously stored location-based environmental signature from the non-transitory computer readable storage medium in item 170, using the second processor and the second communications device. Then, in item 172 these methods can automatically process a workflow using the machine identification code and the second processor.

Further, such methods can display a machine identification message on a second graphic user interface of the second portable computerized device, in item 172, based on the previous processing. Therefore, continuing with the previous example, the graphic user interface of the second portable computerized device could display the percentage probability that the signatures match as well as an indication to the user that such a percentage probability is considered to be (or not to be) a match, thereby indicating the probability that the machine identification code is properly associated with that location.

Additionally, these methods can refine the previously stored location-based environmental signature based on multiple current location-based environmental signatures obtained as the users perform multiple processes of accessing the virtual tag in item 174. Thus, as mentioned above, every time a mobile device utilizes the tag, the existing environmental signature may also be refined to reflect the latest environmental condition sensed by the most recent user(s), using an appropriate smoothing process (if desired).

Figure 2:
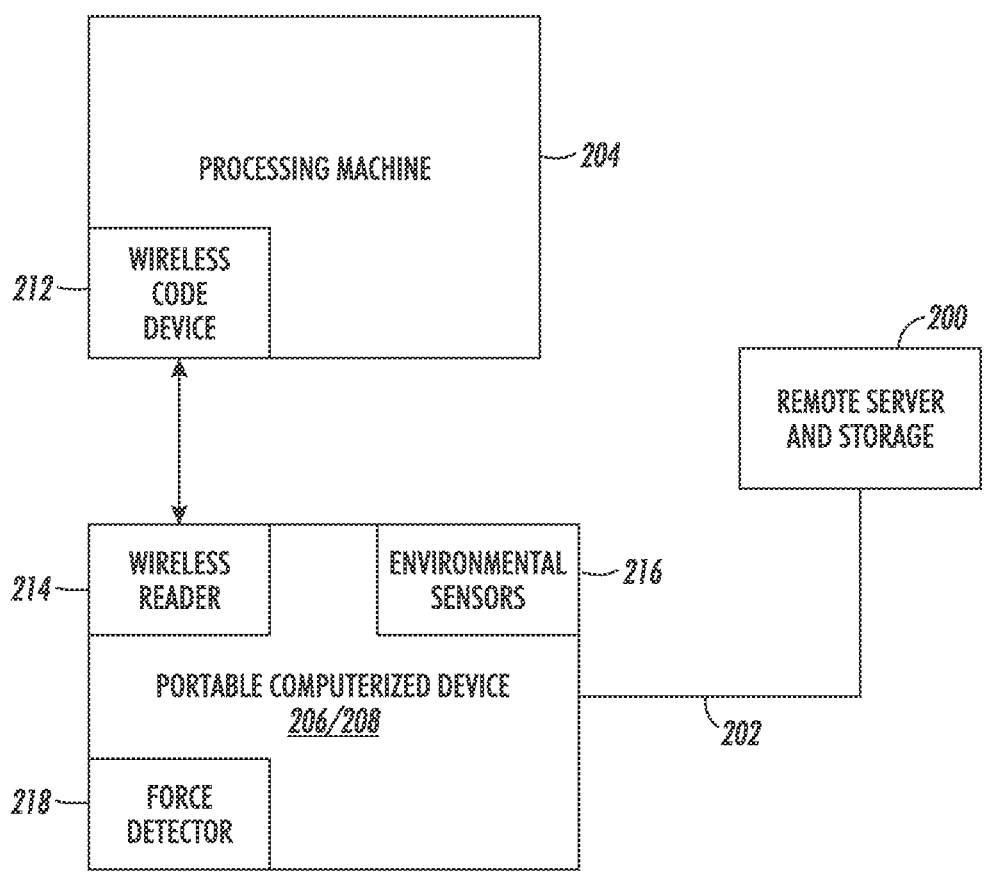
FIG. 2 is a schematic diagram illustrating devices herein.

As shown in FIG. 2, a processing machine 204 (which can be any form of machine that performs a process, such as a printing device, copying device, scanning device, bookmaking device, gaming device, manufacturing device, cleaning device, security device, access device, etc.) is within a predetermined distance of a portable computerized device 206/208, as discussed above. As explained above, the processing machine 204 may (or may not) include a wireless machine identification code device 212 that maintains the machine identification code mentioned above. FIG. 2 also illustrates a remote server 200 (having storage 220, FIG. 5) connected to the portable computerized device 206/208 by way of a wired or wireless network 202.

Further, the portable computerized device 206/208 includes a wireless reader 214 that can read the machine identification code from the machine identification code device 212, as discussed above. Additionally, the environmental sensors are shown as item 216 in the portable computerized device 206/208. Again, these environmental sensors 216 can detect the lighting level, the sound level, the temperature, the altitude, the barometric pressure, compass heading, a wireless signal strength, a wireless signal type. Therefore, these environmental sensors 216 can comprise optical detectors, audio detectors, thermometers, altimeters, barometers, compasses, wireless antenna, etc. In addition, the portable computerized device 206/208 includes a force detector 218 (e.g., accelerometer, etc.) that can detect a near field communication tap using a force detector of a portable computerized device (potentially while the portable computerized device is positioned at a location that is within a predetermined distance from a machine that is associated with a virtual tag). Again, such a "near field communication tap" is the type of motion usually used to initiate near field communications and can include a user tapping, touching, bumping, etc., their portable device against a surface, or a user placing their portable device on such a surface.

Figure 3:
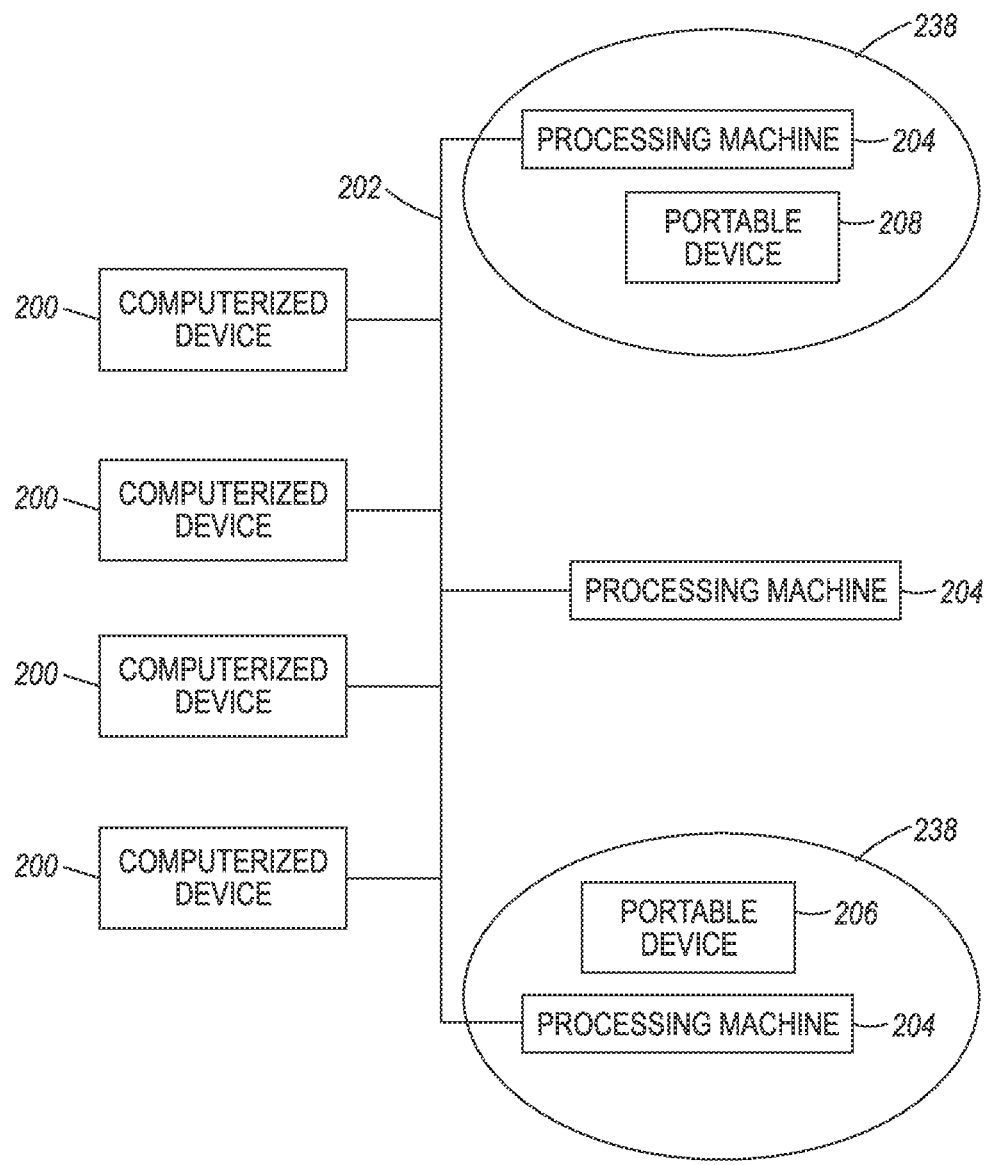
FIG. 3 is a schematic diagram illustrating systems herein.

As shown in FIG. 3, exemplary system systems and methods herein include various computerized devices 200, 204, 206, 208 located at various different physical locations 238. The computerized devices can include print servers, printing devices, personal computers, smartphones, etc., and are in communication (operatively connected to one another) by way of a local or wide area (wired or wireless) network 202.

Figure 4:
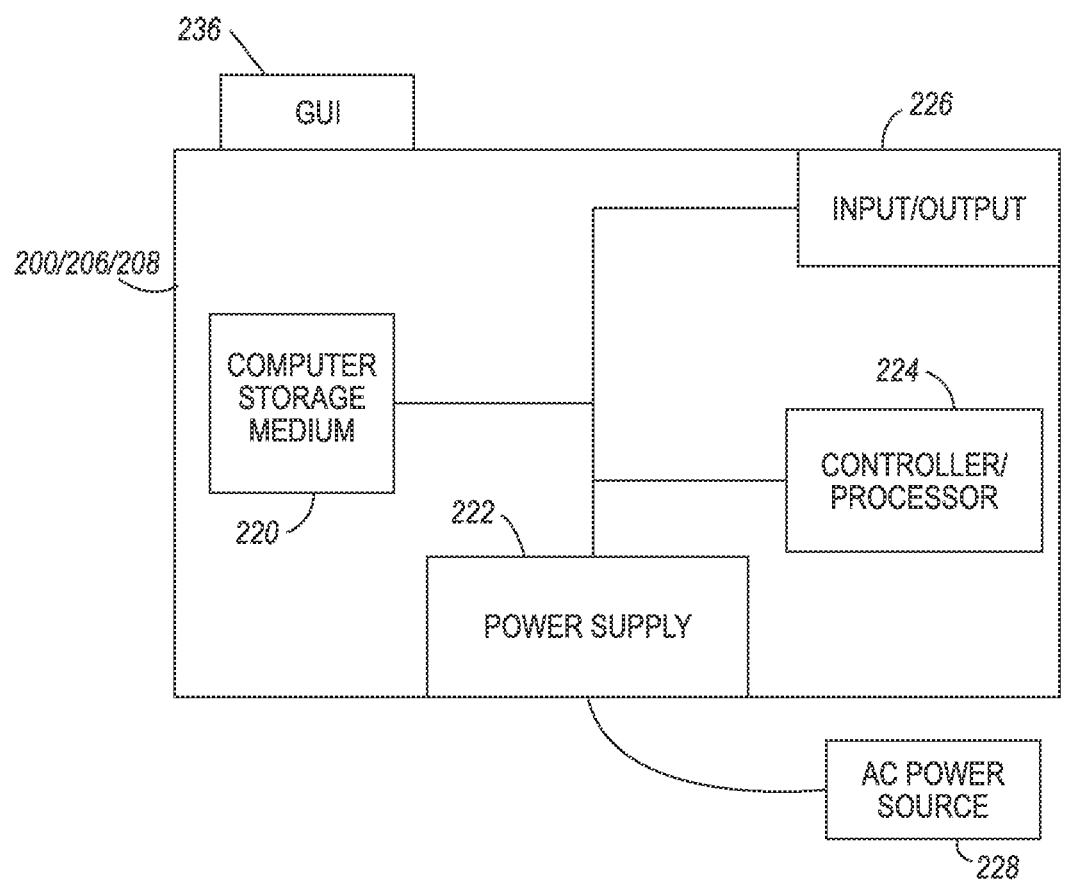
FIG. 4 is a schematic diagram illustrating devices herein.

FIG. 4 illustrates a computerized device 200, 206, 208, which can be used with systems and methods herein and can comprise, for example, a print server, a personal computer, a portable computing device, bookmaking device, gaming device, manufacturing device, cleaning device, security device, access device, etc. The computerized devices 200, 206, 208, each include a controller/processor 224 and a communications port (input/output) 226 operatively connected to the processor 224 and to the computerized network 202 external to the computerized device 200, 206, 208. Also, the computerized device 200, 206, 208, can include at least one accessory functional component, such as a graphic user interface assembly 236 that also operate on the power supplied from the external power source 228 (through the power supply 222).

The input/output device 226 is used for communications to and from the computerized device 200, 206, 208. The processor 224 controls the various actions of the computerized device. A non-transitory computer storage medium device 220 (which can be optical, magnetic, capacitor based, etc.) is readable by the processor 224 and stores instructions (that can be in the form of computer programs, applications, apps, etc.) that the processor 224 executes to allow the computerized device to perform its various functions, such as those described herein. Thus, as shown in FIG. 4, a body housing has one or more functional components that operate on power supplied from an alternating current (AC) source 228 by the power supply 222. The power supply 222 can comprise a power storage element (e.g., a battery, etc).

Figure 5:
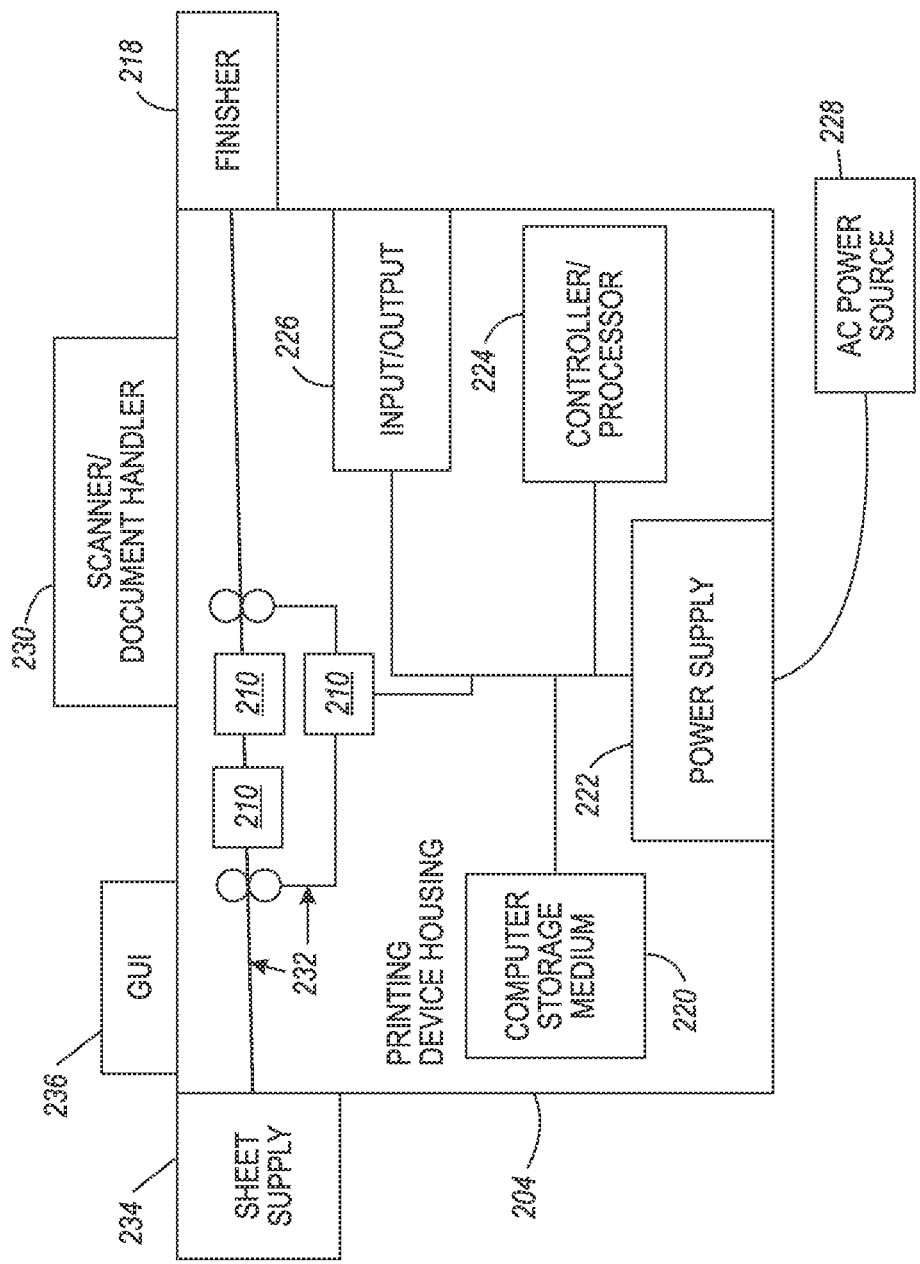
FIG. 5 is a schematic diagram illustrating devices herein.

FIG. 5 illustrates a computerized device that is a processing machine 204, such as a printing device, which can be used with systems and methods herein and can comprise, for example, a printer, copier, multi-function machine, multi-function device (MFD), etc. The processing machine 204 includes all of the components mentioned above and at least one marking device (printing engines) 210 operatively connected to the processor 224, a media path 232 positioned to supply sheets of media from a sheet supply 234 to the marking device(s) 210, etc. After receiving various markings from the printing engine(s), the sheets of media can optionally pass to a finisher 218 which can fold, staple, sort, etc., the various printed sheets. Also, the processing machine 204 can include at least one accessory functional component (such as a scanner/document handler 230, etc.) that also operates on the power supplied from the external power source 228 (through the power supply 222).

Thus, as explained above, exemplary portable computerized devices herein comprise a force detector that detects a near field communication tap while the portable computerized device is positioned at a location that is within a predetermined distance from a machine. Such a "near field communication tap" is the type of motion usually used to initiate near field communications and can include a user tapping, touching, bumping, etc., their portable device against a surface (such as the surface of a machine that is associated with an actual tag or virtual tag representing machine readable code identifying the machine, or some other surface associated with an actual or virtual tag), or a user placing their portable device on such a surface.

The portable computerized devices include sensors operatively (meaning directly or indirectly) connected to the force detector. In response to the near field communication tap, the sensors automatically sense current environmental conditions of the location of the machine in response to the near field communication tap. The portable computerized devices include a processor operatively connected to the sensors. The processor automatically calculates a "current location-based environmental signature" based on the current environmental conditions sensed by the sensors.

Also, the portable computerized devices include a communications device operatively connected to the processor. The communications device automatically matches the current location-based environmental signature to a matching previously stored location-based environmental signature of a plurality of previously stored location-based environmental signatures maintained in a non-transitory computer readable storage medium. Further, the processor and communications device obtains a machine identification code associated with the matching previously stored location-based environmental signature from the non-transitory computer readable storage medium. The processor uses such a machine identification code to process a workflow. In some examples, the machine identification code identifies the machine located where the current environmental conditions were sensed by the sensors, and the workflow is performed, at least in part, using that machine.

Thus, exemplary systems herein comprise a first portable computerized device 208 and a set of computer-executable instructions stored on the computer storage medium 220. The first portable computerized device 208 includes a first force detector 218. The first portable computerized device 208 includes a first force detector 218 (e.g., accelerometer 218, etc.) that detects a near field communication tap during a process of setting up or registering a virtual tag (potentially while the first portable computerized device 208 is positioned at a location that is within a predetermined distance from a given machine 204).

Further, the first portable computerized device 208 includes first sensors 216 operatively connected to the first force detector 218. The first sensors 216 automatically sense present environmental conditions (e.g., the lighting level, the sound level, the temperature, the altitude, the barometric pressure, compass heading, a wireless signal strength, a wireless signal type, etc.) of that location in response to the near field communication tap.

The first portable computerized device 208 includes a first processor 224 operatively connected to the first sensors 216. The processor 224 automatically calculates a previously stored location-based environmental signature based on the present environmental conditions sensed by the first sensors 216. The first portable computerized device 208 includes a first communications device 226 operatively connected to the processor 224. The first communications device 226 automatically stores the previously stored location-based environmental signature in a non-transitory computer readable storage medium 220. When storing the previously stored location-based environmental signature the first communications device 226 also associates the previously stored location-based environmental signature with a machine identification code (possibly associated with the machine 204 that is at that location).

The computer-executable instructions cause a second force detector 218 of a second portable computerized device 206 to detect a second near field communication tap. Second sensors 216 of the second portable computerized device 206 are then directed (by the computer-executable instructions) to automatically sense current environmental conditions in response to the second near field communication tap, and a second processor 224 of the second portable computerized device 206 is similarly directed (by the computer-executable instructions) to automatically calculate a current location-based environmental signature based on the current environmental conditions sensed by the second sensors 216. Further, the computer-executable instructions cause a second communications device 226 of the second portable computerized device 206 to automatically match the current location-based environmental signature to a matching previously stored location-based environmental signature of the plurality of previously stored location-based environmental signatures maintained in the non-transitory computer readable storage medium 220. The second processor 224 and the second communications device 226 are then directed (by the computer-executable instructions) to obtain a machine identification code associated with the matching previously stored location-based environmental signature from the non-transitory computer readable storage medium 220. The second processor 224 can then use the machine identification code to process a workflow.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A portable computerized device comprising:
   a force detector detecting a near field communication tap;
   sensors operatively connected to said force detector, said sensors automatically sensing current environmental conditions of a location in response to said near field communication tap;
   a processor operatively connected to said sensors, said processor automatically calculating a current location-based environmental signature based on said current environmental conditions sensed by said sensors; and
   a communications device operatively connected to said processor,
   said communications device automatically matching said current location-based environmental signature to a matching previously stored location-based environmental signature of a plurality of previously stored location-based environmental signatures maintained in a non-transitory computer readable storage medium, said processor and communications device obtaining a machine identification code associated with said matching previously stored location-based environmental signature from said non-transitory computer readable storage medium, said processor and communications device obtaining said machine identification code based on said matching said current location-based environmental signature to said matching previously stored location-based environmental signature, and not based on wireless near field communications, to provide near field communications behavior to devices not having near field communications capabilities, and said processor using said machine identification code to process a workflow.

2. The portable computerized device according to claim 1, said force detector comprising one of an accelerometer and a horizontal position sensor.

3. The portable computerized device according to claim 1, said current environmental conditions comprising at least one of: a lighting level, a sound level, a temperature, an altitude, a barometric pressure, compass heading, a wireless signal strength, a wireless signal type, and a global positioning system geographic location.

4. The portable computerized device according to claim 1, said machine identification code identifying a machine located where said current environmental conditions were sensed by said sensors.

5. The portable computerized device according to claim 4, said workflow being performed using said machine.

6. A system comprising:
a first portable computerized device and a set of computer-executable instructions, said first portable computerized device comprising:
a first force detector detecting a first near field communication tap;
first sensors operatively connected to said first force detector, said first sensors automatically sensing present environmental conditions in response to said first near field communication tap;
a first processor operatively connected to said first sensors, said first processor automatically calculating a previously stored location-based environmental signature based on said present environmental conditions sensed by said first sensors; and
a first communications device operatively connected to said first processor,
said first communications device automatically storing said previously stored location-based environmental signature in a non-transitory computer readable storage medium,
said non-transitory computer readable storage medium additionally storing a plurality of previously stored location-based environmental signatures,
said storing said previously stored location-based environmental signature further comprising associating said previously stored location-based environmental signature with a machine identification code, and
said computer-executable instructions causing:
a second force detector of a second portable computerized device to detect a second near field communication tap;
second sensors of said second portable computerized device to automatically sense current environmental conditions in response to said second near field communication tap;
a second processor of said second portable computerized device to automatically calculate a current location-based environmental signature based on said current environmental conditions sensed by said second sensors;
a second communications device of said second portable computerized device to automatically match said current location-based environmental signature to a matching previously stored location-based environmental signature of said plurality of previously stored location-based environmental signatures maintained in said non-transitory computer readable storage medium;
said second processor and said second communications device to obtain a machine identification code associated with said matching previously stored location-based environmental signature from said non-transitory computer readable storage medium; and
said second processor to use said machine identification code to process a workflow.

7. The system according to claim 6, said first force detector and said second force detector each comprising one of a accelerometer and a horizontal position sensor.

8. The system according to claim 6, said current environmental conditions comprising at least one of: a lighting level, a sound level, a temperature, an altitude, a barometric pressure, compass heading, a wireless signal strength, a wireless signal type, and a global positioning system geographic location.

9. The system according to claim 6, said machine identification code identifying a machine located where said current environmental conditions were sensed by said second sensors.

10. The system according to claim 9, said workflow being performed using said machine.

11. A method comprising:
detecting a near field communication tap using a force detector of a portable computerized device;
automatically sensing current environmental conditions in response to said near field communication tap, using sensors of said portable computerized device;
automatically calculating a current location-based environmental signature based on said current environmental conditions sensed by said sensors, using a processor of said portable computerized device;
automatically matching said current location-based environmental signature to a matching previously stored location-based environmental signature of a plurality of previously stored location-based environmental signatures maintained in a non-transitory computer readable storage medium, using said processor and a communications device of said portable computing device;
automatically obtaining a machine identification code associated with said matching previously stored location-based environmental signature from said non-transitory computer readable storage medium, using said processor and said communications device, said obtaining said machine identification code being based on said matching said current location-based environmental signature to said matching previously stored location-based environmental signature, and not being based on wireless near field communications, to provide near field communications behavior to devices not having near field communications capabilities; and automatically processing a workflow using said machine identification code and said processor.

12. The method according to claim 11, further comprising refining said previously stored location-based environmental signature based on multiple current location-based environmental signatures.

13. The method according to claim 11, said current environmental conditions comprising at least one of: a lighting level, a sound level, a temperature, an altitude, a barometric pressure, compass heading, a wireless signal strength, a wireless signal type, and a global positioning system geographic location.

14. The method according to claim 11, said machine identification code identifying a machine located where said current environmental conditions were sensed by said sensors.

15. The method according to claim 14, said workflow being performed using said machine.

16. A method comprising:
    detecting a first near field communication tap using a first force detector of a first portable computerized device while said first portable computerized device is positioned at a location that is within a predetermined distance from a machine;
    automatically sensing present environmental conditions of said location in response to said first near field communication tap, using first sensors of said first portable computerized device;
    automatically calculating a previously stored location-based environmental signature based on said present environmental conditions sensed by said first sensors, using a first processor of said first portable computerized device;
    automatically storing said previously stored location-based environmental signature in a non-transitory computer readable storage medium, using a first communications device of said first portable computerized device, said storing said previously stored location-based environmental signature further comprising associating said previously stored location-based environmental signature with a machine identification code;
    detecting a second near field communication tap using a second force detector of a second portable computerized device;
    automatically sensing current environmental conditions in response to said second near field communication tap, using second sensors of said second portable computerized device;
    automatically calculating a current location-based environmental signature based on said current environmental conditions sensed by said second sensors, using a second processor of said second portable computerized device;
    automatically matching said current location-based environmental signature to a matching previously stored location-based environmental signature of a plurality of previously stored location-based environmental signatures maintained in said non-transitory computer readable storage medium, using said second processor and a second communications device of said second portable computing device;
    automatically obtaining a machine identification code associated with said matching previously stored location-based environmental signature from said non-transitory computer readable storage medium, using said second processor and said second communications device; and
    automatically processing a workflow using said machine identification code and said second processor.

17. The method according to claim 16, further comprising refining said previously stored location-based environmental signature based on multiple current location-based environmental signatures.

18. The method according to claim 16, said current environmental conditions comprising at least one of: a lighting level, a sound level, a temperature, an altitude, a barometric pressure, compass heading, a wireless signal strength, a wireless signal type, and a global positioning system geographic location.

19. The method according to claim 16, said machine identification code identifying a machine located where said current environmental conditions were sensed by said second sensors.

20. The method according to claim 19, said workflow being performed using said machine.

* * * * *